(No Model.)

M. A. DEES.
MACHINE FOR LAYING AND NAILING SHINGLES.

No. 463,106.

Patented Nov. 10, 1891.

Fig. 1.

Witnesses:
A. Ruppert,
E. Lene.

Inventor:
Mark A. Dees,
by W. T. Howard
atty.

(No Model.) 5 Sheets—Sheet 2.

M. A. DEES.
MACHINE FOR LAYING AND NAILING SHINGLES.

No. 463,106. Patented Nov. 10, 1891.

Witnesses:
A. Ruppert
E. Cruse

Inventor:
Mark A. Dees,
by G. H. & W. T. Howard
Attys.

(No Model.) 5 Sheets—Sheet 3.

M. A. DEES.
MACHINE FOR LAYING AND NAILING SHINGLES.

No. 463,106. Patented Nov. 10, 1891.

Witnesses:
A. Ruppert.
E. Cruse.

Inventor:
Mark A. Dees,
by G. H. W. T. Howard
Attys.

(No Model.) 5 Sheets—Sheet 4.
M. A. DEES.
MACHINE FOR LAYING AND NAILING SHINGLES.
No. 463,106. Patented Nov. 10, 189

Witnesses:
A. Ruppert,
E. Cruse.

Inventor:
Mark A. Dees, (No Model.) 5 Sheets—Sheet 5.

M. A. DEES.
MACHINE FOR LAYING AND NAILING SHINGLES.

No. 463,106. Patented Nov. 10, 1891.

Witnesses:
A. Ruppert,
E. Cruse

Inventor:
Mark A. Dees,
by Geo. W. T. Howard
atty.

THE NORRIS PETERS CO., PHOTO-LITHO., WASHINGTON, D. C.

UNITED STATES PATENT OFFICE.

MARK A. DEES, OF MOSS POINT, MISSISSIPPI.

MACHINE FOR LAYING AND NAILING SHINGLES.

SPECIFICATION forming part of Letters Patent No. 463,106, dated November 10, 1891.

Application filed December 13, 1890. Serial No. 374,636. (No model.)

*To all whom it may concern:*

Be it known that I, MARK A. DEES, of Moss Point, in the county of Jackson and State of Mississippi, have invented a new and useful Improvement in Machines for Laying and Nailing Shingles, of which the following is a specification, reference being had to the accompanying drawings, and to the letters of reference marked thereon.

My invention is intended to perform by machinery what heretofore, so far as I have been able to learn, has been done exclusively by hand, and in a better, quicker, and more economical manner.

My invention is applicable to the laying and nailing of green shingles as well as those the use of which is now generally preferred, known as "kiln-dried" shingles, and may also be employed for laying and nailing shingles of unequal widths or those of common width throughout, usually termed "dimension" shingles.

In the accompanying drawings, Fig. 3 is a transverse section through a series of shingles resting on the machine ready to be laid. Fig. 4 is a side elevation of the machine as viewed from the side opposite to that in which it is seen in Fig. 2, the hammer being down. Figs. 5, 6, 7, 8, $8^a$, 9, and $9^a$ show details hereinafter described. Figs. 15 and $15^a$ show a detail.

Similar letters of reference indicate similar parts in the figures.

A represents the rafters of the roof, and $a$ the sheathing-boards.

Figures 8, 8A, 9, 9A:
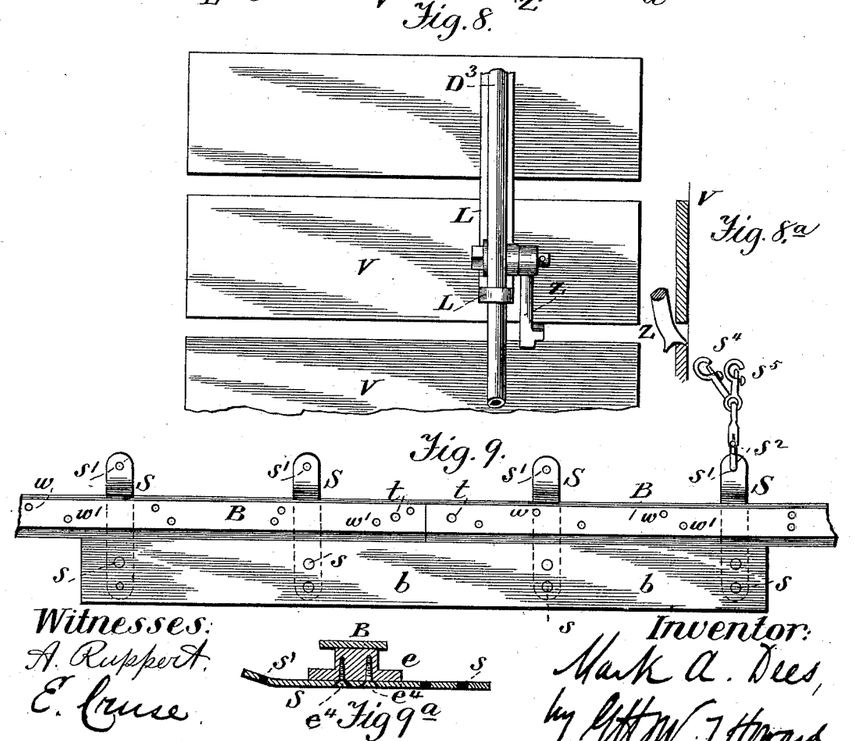

B is a track, preferably formed of a series of bars secured together end to end by a board $b$, as shown in Fig. 9. The track-bars are by preference used in sections of twelve feet, so as to make the track of any desired length. The track-bars B are attached to chains C, (one only being shown in the drawings,) which may be secured to the peak of the roof or otherwise, the chains being long enough to extend down near the eaves. The function of the track is to guide the machine in its movement in laying and nailing shingles, as will be explained hereinafter.

The machine proper comprises a framework which may be designated by bars D, D', $D^2$, and $D^3$, they together forming a figure in the nature of a square or parallelogram. The frame is supported by two flanged wheels $d$, which run upon the track B, and, except as hereinafter specified, by two unflanged wheels $d'$ at the opposite or front end of the frame. The frame, although I shall allude to the sections thereof as bars, is preferably made of gas-pipe joined at the corners by suitable bends or connections, the bars or sections of pipe being threaded and screwed into the bends or connections or secured to them by pins.

Figures 2, 10, 11, 12:
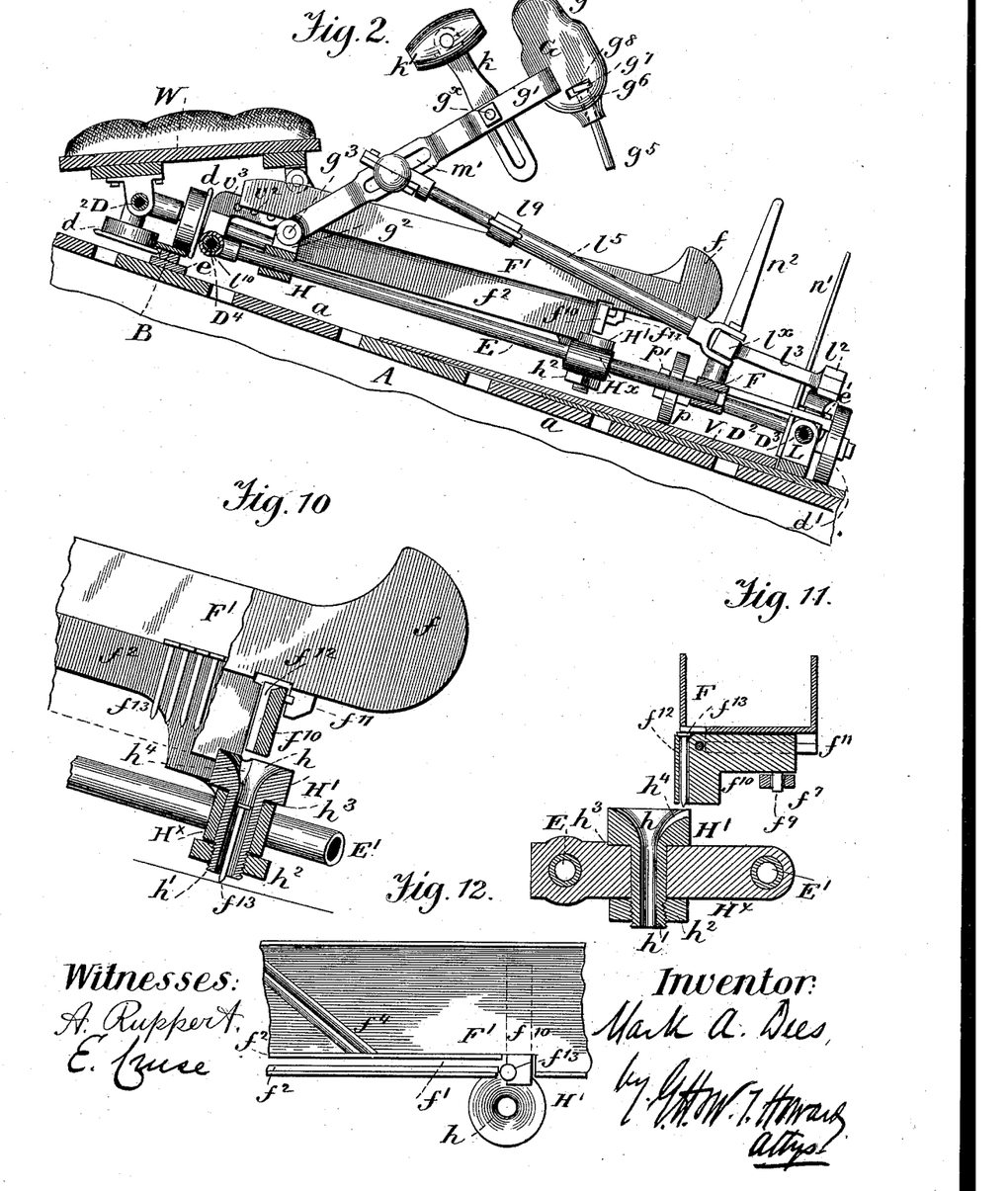
Fig. 2 is a view, partly in vertical longitudinal section, showing the hammer partly raised and a shingle in the act of being moved under it for nailing.
Figs. 10, 11, and 12 represent other details upon an enlarged scale.
Figures 4, 5, 6, 7:
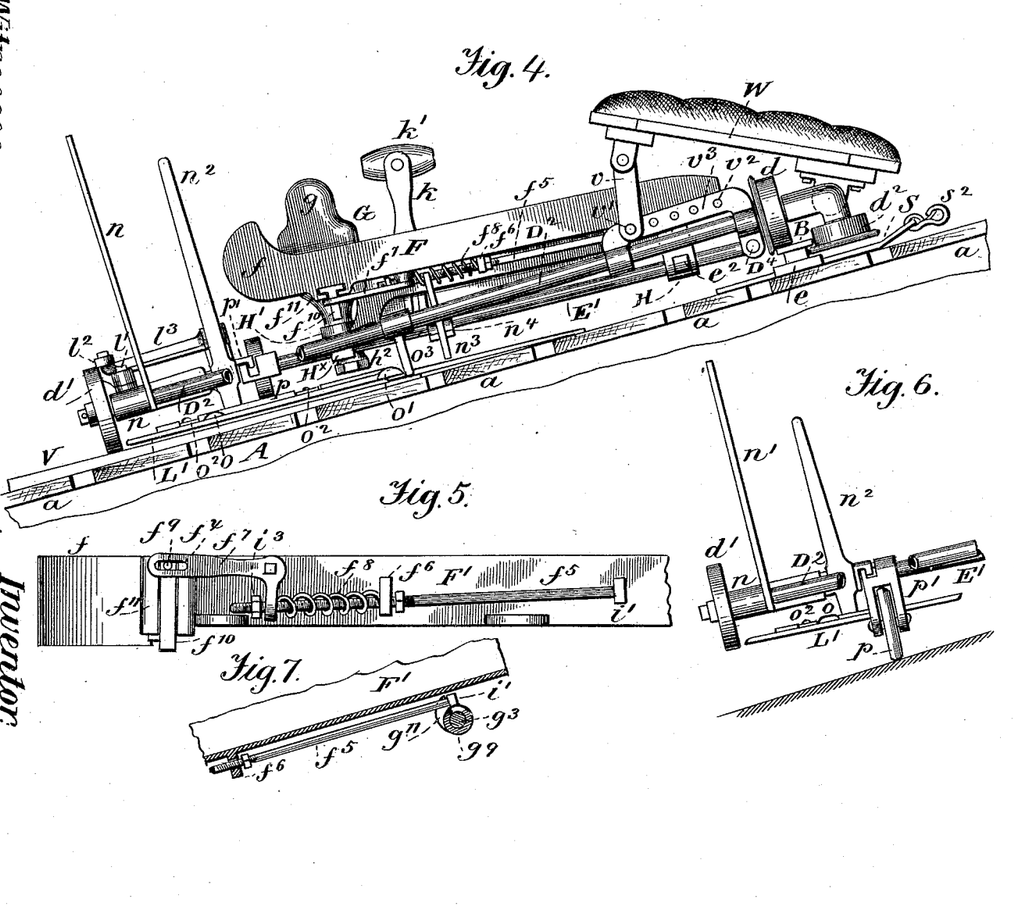

Referring more particularly to Fig. 2, it will be seen that the track-bars B rest upon and extend over a wooden base $e$. This construction is intended, in connection with flanged wheels $d^2$, also carried by the frame, to prevent the descent or slipping down of the machine upon a steep roof, the flanges of the wheels $d^2$ running under the outer overhanging edge of the track-bars B, as seen in Figs. 2 and 4.

Attached to the bars D' $D^2$ of the frame is a cross-bar $D^4$, to which the rear end of a sub-frame, made of bars E E', is secured by suitable connections. Each bar of the sub-frame is united at its forward end to a T-casting F, which is adjustably secured to the bar $D^3$ of the frame by means of a strap-bolt passing under the bar and having nuts $e'$. The opposite or rear end of the sub-frame is also adjustably secured to the cross-bar $D^4$ by means of set-screws. By this construction certain parts adapted with the sub-frame to have a sliding lateral movement upon said bars $D^3$ $D^4$ may be adjusted to suit the different widths of shingles to be laid.

The sub-frame carries the nail-box F' and the hammer G. A yoke H (see particularly Figs. 1 and 2) is supported upon the rods E E' toward their rear, and a corresponding yoke $H^x$ is supported upon the same rods near their forward ends. The yokes H H$^\times$ may be integral and united by a rib or be separate, as preferred. The nail-box F' is supported by the yokes H H$^\times$ and made adjustable with them longitudinally of the rods E E' by means of set-screws $e^2$. The nail-box F' consists, principally, of a trough having two sides, a bottom, a rear end, and a forward hood $f$. At one side of the bottom of the nail-box is a slot $f'$, in which is inserted a nail guide or run, consisting of two sheets of steel or iron $f^2$, separated at the rear end by a block. The depth of the nail guide or run is approximately that of the length of the nails to be used. The object of the nail guide or run $f^2$ is to feed the nails (which are promiscuously thrown into the box F') one by one to the hammer device, as will be hereinafter explained.

The bottom of the nail-box is provided with angularly-arranged ridges $f^4$, preferably triangular in cross-section, the object of the ridges being to turn or divert the nails into the guide or run $f^2$. The hood $f$ at the forward end of the nail-box is intended to prevent the nails from passing out at that end and also to collect the nails which descend by gravity thereto. From the hood the nails are brought backward by the fingers of the operator to find their way or be diverted by the ridges $f^4$ into the nail guide or run.

The hammer G consists of a weighted head $g$ and a shank $g'$, the latter being pivoted to a lug $g^2$, forming a part of the rear yoke H, by means of a pin $g^3$. The upward movement of the hammer is limited by the stop or projection $g^4$, which, when the hammer is in its highest position, comes up against the rear of the yoke. The operative part of the head of the hammer, or that which actually drives the nail, consists of a steel driver $g^5$, which is inserted in a hole $g^6$, larger in diameter than that of the driver $g^5$, so as to allow the said driver to have a loose or wabbling movement in the weighted head. The driver may be secured to the weighted head in any suitable manner provided it has the loose movement referred to; but I prefer to attach it to the head by means of a nut $g^7$, which is secured upon the upper threaded end of the driver, the nut being inserted within a space or hole $g^8$ in the head provided for the purpose. The arrangement of the hammer head and driver is shown specially in Fig. 2, from which it will be seen that the effect of the loose movement of the driver within the weighted head is to permit the driver to move downward throughout the last part of its stroke in a vertical line, which would not be permissible were the driver rigid within the head.

Attached to or carried by the yoke H$^\times$ is the nail-socket H', having its mouth $h$ funnel-shaped, as shown particularly in Figs. 10 and 11. The nail-socket is preferably made of steel and provided with a tubular portion $h'$, which is inserted within the yoke H$^\times$, the tubular portion $h'$ being screw-threaded at its lower end and provided with a nut $h^2$, which, together with the shoulder $h^3$ of the upper portion of the nail-socket, firmly unites the socket to the yoke. The function of the nail-socket H' is to receive the nails one by one as they are freed from the nail guide or run $f^2$, so as to be in readiness to be driven by the hammer, as hereinafter more fully explained.

The feeding of the nails singly to the nail-socket H' in readiness to be driven is carried out by the following mechanism: Under the nail-box F' and running longitudinally thereof is a rod $f^5$, (see Figs. 5 and 7,) the forward end of which is screw-threaded, as shown. Under the nail-box is a lug $f^6$. A bell-crank $f^7$ is pivoted to the under side of the nail-box, the short arm of said crank being perforated for the passage therethrough of the threaded end of the rod $f^5$. A spiral spring $f^8$ is confined between the lug $f^6$ and the short arm of the bell-crank $f^7$, the tendency of which spring is to force the long arm of the bell-crank to its normal position of rest. The long arm is slotted, as shown at $f^\times$, Fig. 5, and receives the pin $f^9$ of the nail-feeder $f^{10}$, which slides transversely of the nail-box in grooves $f^{11}$, Figs. 4 and 5. The nail-feeder $f^{10}$ is made of steel and provided at one side, in a position to bring it in a line with the nail guide or run, with a slot or groove $f^{12}$, which, when the nail-feeder is in its normal position, forms, in fact, the end of said guide or run $f^2$, and into which groove the foremost nail is carried by the guide or run in readiness to be moved laterally by the nail-feeder $f^{10}$ over the funnel-mouth of the nail-socket H', from which it drops by its own gravity into said socket. The construction is such that the action of the nail-feeder is timed to drop a nail into the nail-socket just as the hammer is at its highest point, so that the nail shall be ready to be struck by the driver upon the descent of the hammer.

The hammer and nail-feeder are made to act conjointly as follows: Upon the sleeve $g^9$, through which the pin $g^3$ of the hammer passes, (see Fig. 7,) is formed a forked or divided projection $g^{11}$, behind the two parts of which is placed the head $i'$ of the rod $f^5$. The projection $g^{11}$ as the hammer is raised has the tendency to force the rod $f^5$ backward longitudinally of the nail-box against the force of the spiral spring $f^8$, and the nut $i^3$ on the end of the rod will draw against the short arm of the bell-crank $f^7$ and force out the long arm of said bell-crank, thus forcing out the nail-feeder $f^{10}$ and pushing the foremost nail resting in the guide or run $f^2$ outward over the nail-socket H', from which position it will drop by gravity into the socket, as aforesaid. The connection between the nail-feeder $f^{10}$ and the long arm of the bell-crank $f^7$ is made by the slot $f^\times$ and pin $f^9$, as shown in Fig. 5, so that the transverse movement of the nail-feeder is provided for irrespective of the movement in the arc of a circle of the long arm of the bell-crank.

The arrangement of the parts just described is seen in Figs. 4, 5, 7, 10, 11, and 12. Fig. 12, which is a top view of a portion of the nail-box, guide, or run, nail-socket, and nail-feeder, shows the nail-feeder $f^{10}$ in the act of conveying a nail $f^{13}$ over the nail-socket H′ to be dropped, as hereinbefore explained. Fig. 11 shows in vertical transverse section the same position of parts represented in Fig. 12. Fig. 10 shows a nail after it has dropped into the nail-socket and a series of other nails within the guide or run approaching the nail-feeder, in readiness to be dropped, as aforesaid. The mouth of the nail-socket may be provided, if desired, with a groove $h^4$ for the purpose of permitting the use of a nail longer than that shown, in which case the groove $h^4$ serves to permit the point of the nail to extend lower than it is shown extended in the drawings.

To the shank $g'$ of the hammer is secured by means of a bolt $g^\times$ a slotted handle-support $k$, having a handle $k'$ attached thereto, which is preferably made revoluble upon a pivot for greater convenience in use. The purpose of providing the handle-support $k$ with a slot is to make the handle device vertically adjustable. The handle-support may, if desired, be inclined forward or backward upon its pivotal bolt $g^\times$.

I will now describe the means for laying and nailing shingles. It must be first understood that the principle of feeding embodied in this machine is that of automatically dropping or placing a shingle upon the roof-sheathing, after which the machine is moved away from the shingle, so placed such a distance as to bring the nail-socket H′ to that point over the shingle at which the nail is to be driven. Thus the operation of the machine, generally considered, is that of successively placing a shingle, shifting the machine along, and driving the nail. The movement of the machine is timed with the action of the hammer and determined by the width of the shingle.

A yoke L is attached to or adapted to slide upon the front bar $D^3$ of the frame and carries in its movement an arm L′, placed at a right angle to the yoke and front frame-bar $D^3$. The yoke L at the end near the arm L′ is provided with a pin $l'$, to which is pivotally connected a rod or link $l^2$, pivoted in turn to the long arm of the bell-crank $l^3$, which has its fulcrum on the pin $l^4$, extending from the T-casting F. The short arm of the bell-crank $l^3$ is connected at one end by means of a ball-and-socket or universal joint $l^\times$ to a telescopic or extensible rod $l^5$, the other end of the said rod $l^5$ being connected also by a universal joint with a pin $m$, passing through a slot $m'$, formed in the hammer-shank $g'$. The telescopic construction of the rod $l^5$ is preferably accomplished by the use of a tube as one portion of the structure and a rod fitting within the tube as the other part, the tube and rod being made to become practically one piece by means of a set-screw $l^9$. The adjustability of the pin $m$ within the slot $m'$ of the hammer-shank $g'$ is effected by means of a nut on the threaded end of the pin and a collar, and is intended to provide for the laying of shingles of varying widths.

Formed integrally with the corner casting $n$ of the frame of the machine is a shingle stop or stake $n'$, the function of which is to hold the butt-ends of a series of shingles (see Fig. 3) placed in the machine ready to be laid one by one. The arm L′ is provided with two lateral extensions $o\ o'$ and with inner fingers $o^2$. The purpose of the extensions $o\ o'$ is to extend the arm L′, so as to prevent the shingles dropping behind the arm when it has been moved inward. To the side bar $D^2$ of the frame is attached a casting $o^3$, upon which the extension $o'$ slides and is supported as the arm L′ is drawn inward toward the nail-box F′ by the lifting of the handle $k'$, which raises the hammer.

Figure 1:
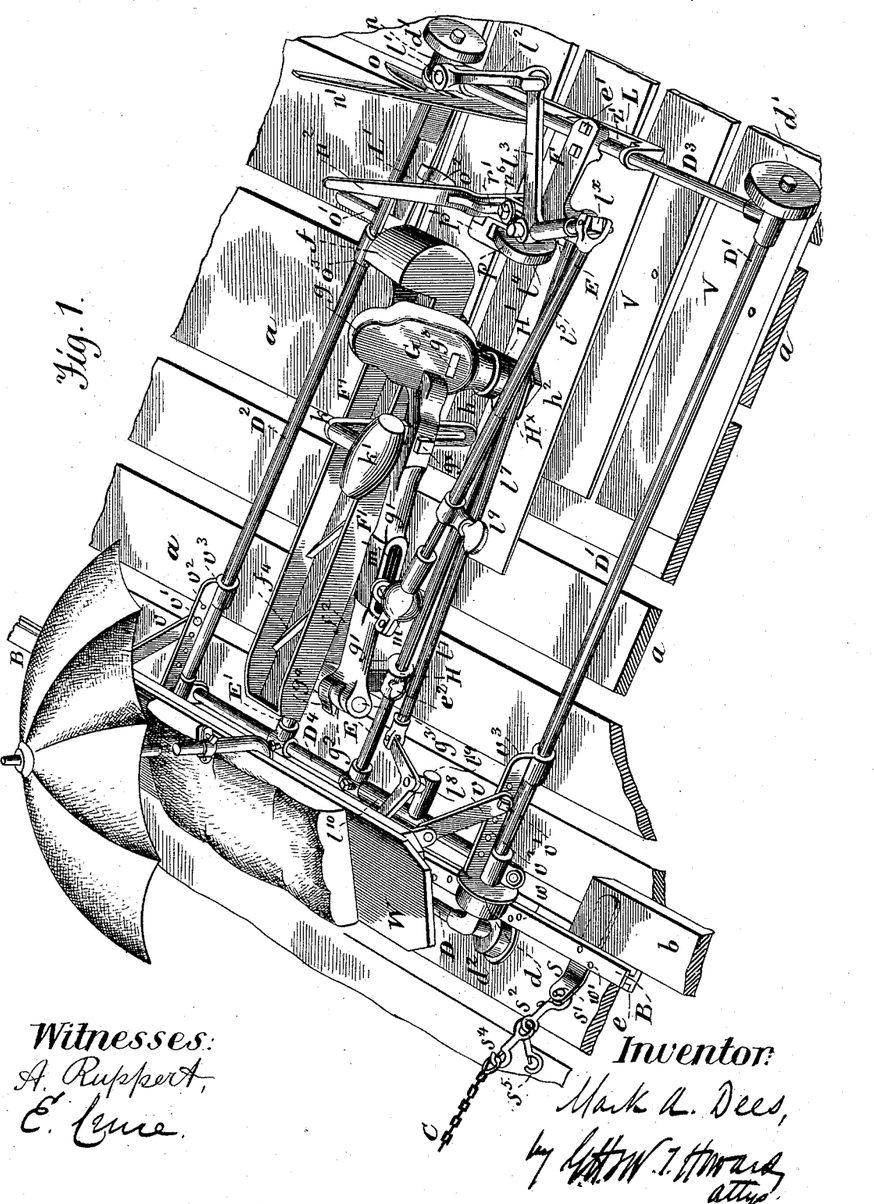
Figure 1 is a perspective view showing my machine resting upon a roof in position for laying and nailing shingles, the hammer being in its depressed position.
Figure 13:
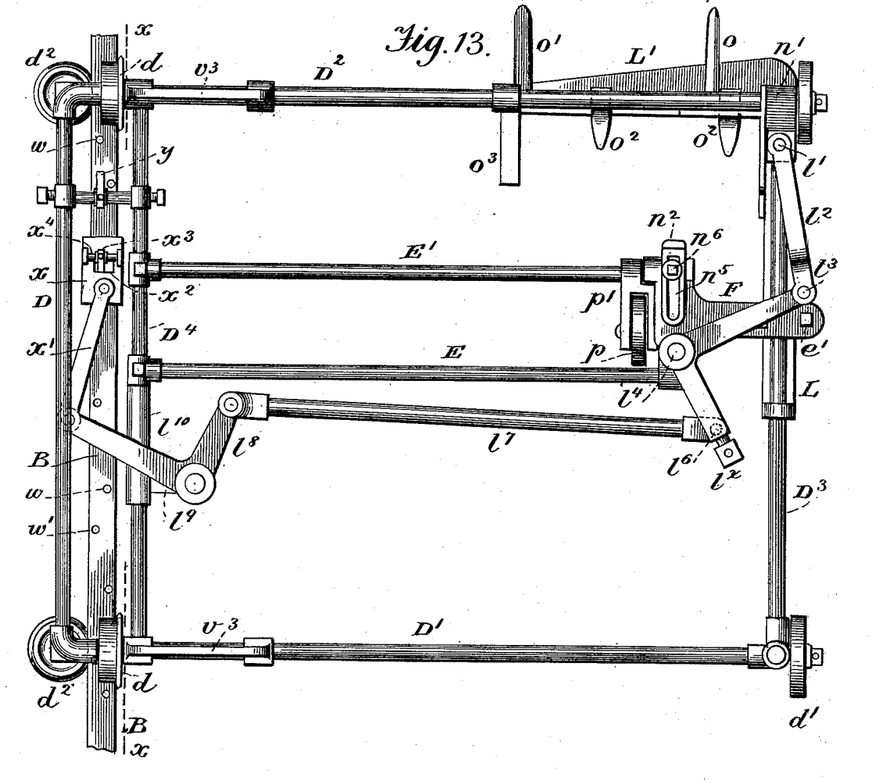
Fig. 13 is a plan view, certain parts being removed.

I will now proceed to describe the general operation of the machine, and in so doing will describe the construction and working of parts not yet alluded to. A series of shingles having been placed in the machine so that their butt-ends shall rest against the stop or stake $n'$ in the position shown in cross-section in Fig. 3, their inner sides are held and guided by the stake $n^2$. (Shown particularly in Figs. 1, 3, and 4.) The stake $n^2$ is adjustable upon the sub-frame by means of slotted connections and bolts $n^5\ n^6$. (See Figs. 3, 4, and 13.) The normal position of the machine is that in which the hammer is in its lowest position and the arm L′ out, as is shown in Figs. 1 and 13. The series of shingles now rest with their outer edges parallel with the side bars of the machine and their butts resting against the stop or stake $n'$, as above stated, the inner side of the under shingle of the series resting on the roof and its outer side on the fingers $o^2$. We are supposing the under shingle to be practically in the position in which it is to be nailed. It now becomes necessary to move the machine laterally, so as to bring the nail-socket H′ over that part of the shingle through which the nail is to be driven. This is effected by raising the hammer by means of the handle $k'$. The bottom shingle being stationary, (by reason of its being held by the adjoining shingle, or, if the first shingle on the roof, by being nailed thereto,) as soon as the inner edge of the arm L′ is brought up against the side of the shingle the shingle acts as an abutment to the machine, and the machine is accordingly moved laterally toward and over the shingle through the medium of the bell-crank $l^3$ and its connections. The stop $g^4$ at the end of the hammer-shank $g'$ limits the upper movement of the hammer, by which means the advance of the entire machine is checked, and the arrangement is such that the advance is only sufficient to bring the nail-socket to the proper point of the shingle for nailing. It will now be understood that the hammer is fully raised, that a series of nails have been traveling down the guide or run $f^2$, and that the foremost nail at the moment when the hammer reaches the highest point has been moved forward from the guide or run by the nail-feeder $f^{10}$ and brought over the nail-socket H', so that it may drop by gravity into position to be struck and driven by the descending hammer. In the meantime another shingle has dropped down in readiness to be nailed as soon as the machine is again shifted, so as to bring the nail-socket in proper position for nailing. The lateral or advance movement of the machine is facilitated by the rollers $d'$ at the front of the frame and the flanged wheels $d$ at the upper end, the latter resting upon the track-bars B. Another wheel $p$, running in a bearing $p'$, pivoted upon the bar E' of the sub-frame, is an important factor in the operation of the machine, said wheel acting as a pressing-roll upon the shingle which is being nailed and serving to hold it down tightly to the roof-sheathing during the operation of nailing. The pivotal arrangement of the bearing of the wheel $p$ is to allow it to be shifted to the position shown in Fig. 6 when the machine is to be run back. It might sometimes happen that the fingers $o^2$, when suddenly withdrawn from under the shingle about to be nailed as the hammer is descending, would catch under said shingle and withdraw it from the proper position for nailing. In order to obviate this danger I place under the T-casting a pawl $r$, (see Fig. 3,) the front and sharpened edge of which will in such a case press into the shingle V and hold it from displacement. I also provide a plate-spring $r'$, attached to the rear side of the stake $n^2$, the function of which spring is to force the side of the shingle against the inner side of the arm L', so as to preserve the parallel position of the shingle as laid.

The entire nailing device, including the hammer, nail-box, and nail-socket, is made adjustable longitudinally of the sub-frame E E', the yokes H H', supporting the nailing device, being adapted to slide upon the sub-frame and to be secured thereto by means of set-screws $e^2$. The object of making the nailing device longitudinally adjustable on the sub-frame and the rod $l^5$ telescopic is to allow the nailing device to be shifted, so as to bring the nails in proper relation to the sheathing.

I will now more fully describe the track and its adjuncts. Attached to the wooden base $e$ by means of the screws $e^4$ are a series of straps S, preferably about three feet apart and let into the base, as shown in Figs. 9 and $9^a$. The straps S are intended primarily to allow the track to be slid upon the roof and to prevent the wooden base $e$ of the track from falling between the sheathing, should the spaces be greater than the width of the base, said straps bridging any spaces likely to be met with. The straps also serve to admit of the joining of the track-bars by means of the board $b$, which need not necessarily accompany my machine. Holes $s$ are provided for securing the straps S to the board $b$. The other ends of the straps have holes $s'$, to which hooks $s^2$ are attached. The chains are represented by C and are formed of one-inch links. To the hooks $s^2$ are connected, preferably by links, two other hooks, one of which $s^4$ is half an inch longer than the other $s^5$; and if the coursing-lines are in inches either hook is used alone in measuring the distance, but if half-inches are to be used in regulating the coursing-line, (by which is meant the line of exposure of the shingle to the weather,) then the long and short hooks are used alternately, by which means the fraction of the inch can be obtained. The hooks $s^4$ $s^5$ may be connected directly to the strap S, or the strap may be itself extended and have its forward end formed with hooks of different lengths.

Figure 14:
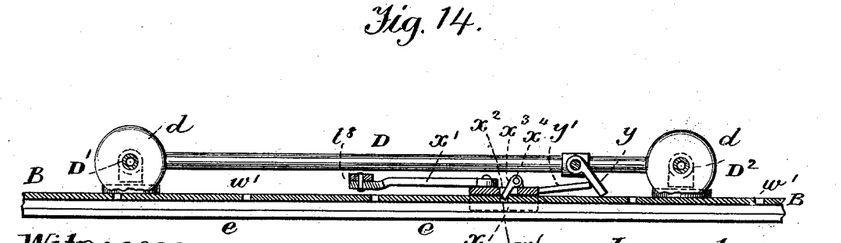
Fig. 14 is a transverse section of Fig. 13 on the line $x$ $x$.

Figs. 13 and 14 show more especially the means for effecting what is termed the "spacing" of the shingles. By "spacing" is meant the leaving of a narrow space between the edges of adjacent shingles which is necessary to admit of the expansion of dry shingles. In order to accomplish this I provide the track-bars B with two or more series of holes $w$ $w'$, the holes of each series being of equal distance apart. Thus one row of holes $w$ will be used for laying shingles of, say, four inches, and the row of holes $w'$ for laying shingles of, say, five inches in width. The bell-crank $l^3$, hereinbefore described, is in this modification provided with a downwardly-projecting wrist-pin $l^6$, and to said wrist-pin is connected a link $l^7$, which runs back to a second bell-crank $l^8$, having its fulcrum in a bearing $l^9$, attached to a sleeve $l^{10}$ upon the cross-bar $D^4$ and moving with the sub-frame E E'. The long arm of the bell-crank is connected to a sliding carriage $x$ by means of a link $x'$. The carriage is adapted to slide upon the track-bars B and is perforated, as shown at $x^2$, carrying a pivoted pawl $x^3$, which is laterally adjustable within the perforation $x^2$ upon the pivot $x^4$. The perforation $x^2$ is of sufficient width to permit the lateral adjustment of the pawl $x^3$ upon its pivot, the pawl being adapted to be secured rigidly upon the pivot which turns in its bearings. The adjustment of the pawl $x^3$ laterally is to bring it opposite the row of holes in the track-bars with which it is intended to engage. Fig. 14 shows the pawl in engagement with one of the holes.

In order to prevent the momentum of the machine as it is being moved over the roof from carrying the machine beyond the point at which it is intended to stop at the end of each movement, I provide a second pawl $y$, pivoted between the bar D of the frame and the cross-bar $D^4$. The pawl $y$ is intended to engage the holes of the same row as those engaged by the pawl $x^3$; but the two pawls act alternately—that is to say, when the pawl $x^3$ is engaged by one of the holes the pawl $y$ is free, so that the machine may move. In order to effect this result I attach to the side of the sliding carriage $x$ a projection $y'$, (see particularly Fig. 14,) which projection, as the sliding carriage $x$ is moved by means of the bell-crank $l^3$, will push the pawl $y$ out of engagement with the hole.

Fig. 14 shows the pawl $y$ in a position ready to enter the hole next in front of it as soon as the machine has advanced sufficiently to allow the pawl to enter it. This spacing attachment is also used for giving the requisite lap to the shingles, which may be done by shifting the track laterally, so as to give a two-inch or any other desired lap, for, as will be seen, as soon as the track has once been adjusted for the purpose of giving a specified lap it follows that the same lap will be given to the entire course of shingles.

Figures 3, 15, 15A:
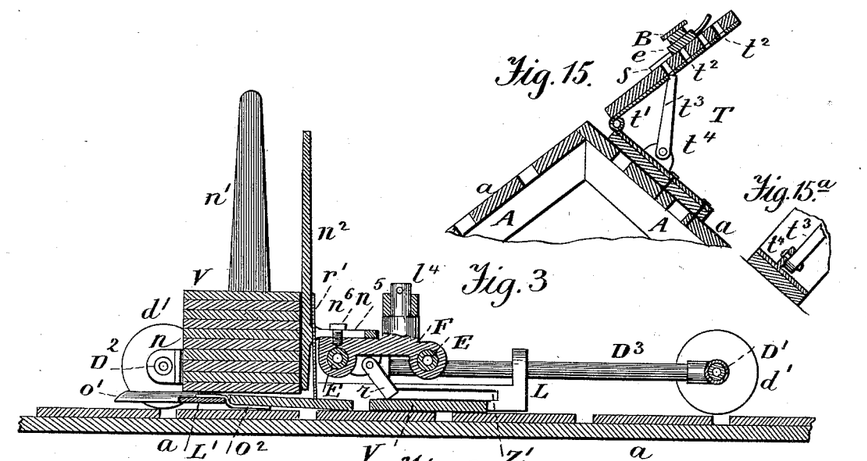

While I prefer to use the spacing device just described, I have devised other means, (shown in Fig. 8,) consisting of a pawl $z$, the pivot of which is adjustably secured in the slot $z'$, Figs. 1 and 3, of the yoke L at the front of the machine, the pawl being adapted to press against an edge of the shingle, the shingle then serving as an abutment in the lateral movement of the machine. (See Figs. 8 and 8ª.)

It is necessary to provide some means whereby the machine may be prevented from running off the track at the ends, and I therefore furnish the track-bars B at each end with a hole $t$, into which a pin may be inserted for engagement with the flanged wheels $d$ when they reach the end of the track. Fig. 9 shows these holes in the track-bars, but not at the ends of the tracks, as the bars here shown are arranged, it being evident that the holes are only intended for use with the bars, which may be the outer ones of the series forming the track.

When the shingles have been laid near to the peak of the roof, there will not be sufficient room upon the roof for the further use of the machine in laying the last courses. I therefore show in Figs. 15 and 15ª a device whereby the support for the track may be extended upward. The device consists of two or more hinged brackets T, the lower leaf of each of which is temporarily nailed to the sheathing $a$, as shown, said leaves of the bracket being hinged together by a strap-hinge $t'$. A series of holes $t^2$ are provided in the upper leaf, which are engaged by a strut $t^3$, pivoted at $t^4$ to the lower leaf of the bracket. The arrangement is such that the upper leaf can be adjusted to suit any desired angle of roof. The track is shown in its position upon the bracket, it being understood that it is so placed for laying the last course of shingles on the roof.

The operator in working the machine occupies a seat W, which may be cushioned. (Shown particularly in Figs. 1, 2, and 4.) Referring to Figs. 2 and 4, it will be seen that the seat W is pivoted to the rear bar D of the frame, so that the seat may be moved to suit different angles of roofs. The adjustment at any desired angle is effected by means of the supports $v$, Figs. 1 and 4, the pins $v'$ of which are adapted to enter any of the holes $v^2$ of the yokes $v^3$, secured to the side bars D' D² of the frame of the machine.

An umbrella or sunshade may be attached in any convenient way to or near the seat, as shown in Fig. 1, and made extensible and adjustable in any suitable manner.

It has been found that in using this machine the work done by one man is equal in extent to that done by four men in the ordinary manner, and that the character of work done is equal in all respects to hand work, and that, in fact, the courses are laid and nailed more regularly and efficiently than can be done by hand.

Having described my invention, I claim—

1. The combination, in a machine for laying and nailing shingles, of a movable frame, an arm having a sliding connection to said frame, a nail-driver pivoted on the movable frame, and means for connecting the nail-driver, the frame, and the arm, whereby the movement of the nail-driver will cause a sliding movement between the frame and arm, substantially as and for the purpose described.

2. The combination, in devices for laying and nailing shingles, of a track provided with a series of holes equally spaced, a frame supported on wheels adapted to run on the track, a pivoted pawl having a sliding connection to said track and adapted to enter the holes therein, a nail-driving device mounted on the frame, and means for connecting the nail-driving device, the pivoted pawl, and the frame, whereby the movement of the nail-driving device will cause the frame to move a predetermined distance over the track, substantially as specified.

3. In a machine for laying and nailing shingles, the combination of a movable frame adapted to carry a pile of shingles, an arm having a sliding connection to said frame and adapted to engage the bottom shingle of said pile, a nail-feeder, a nail-driver pivoted on said frame, and means for connecting the nail-driver, the frame, and the arm, whereby the movement of the nail-driver will cause a sliding movement between the arm and the frame and thereby separate the bottom shingle from the others and bring the nail-feeder over it, substantially as specified.

4. In devices for laying and nailing shingles, a track provided with a series of holes equally spaced, a frame supported on wheels adapted to run on said track and to carry a pile of shingles, and a pivoted pawl having a sliding connection to said track and adapted to enter the holes therein, combined with an arm having a sliding connection to the frame and adapted to engage the bottom shingle of said pile, a nail-feeder, a nail-driver pivoted on said frame, and means for connecting the nail-driver, the frame, the pivoted pawl, and the arm, whereby the movement of the hammer will cause the frame to move a predetermined distance on the track, separate the bottom shingle from the remainder, and bring the nail-feeder over it, substantially as specified.

5. In a machine for laying and nailing shingles, a movable frame and an arm having a sliding connection thereto, combined with a sub-frame adjustably mounted on the movable frame, a nail-driver pivoted on the sub-frame, a nail-feeder supported on the sub-frame, and means for connecting the nail-driver, the arm, and nail-feeder, whereby the movement of the nail-driver will cause a sliding movement between the arm and movable frame and also operate the nail-feeder, substantially as described.

6. The combination, in a machine for laying and nailing shingles, of a frame, a sub-frame adjustable thereon, a yoke L, adapted to slide upon the frame and carrying an arm L', a hammer having its shank pivotally supported by the sub-frame, a nail-box also supported by the sub-frame and having a nail guide or run, a nail-feeder moving under and transversely of the nail-box at the end of the guide or run, means for operatively connecting the hammer-shank with the nail-feeder, and a bell-crank and adjuncts for connecting the yoke L with the hammer-shank, substantially as set forth.

7. The combination, in a machine for laying and nailing shingles, of a frame, an arm L', having a sliding connection to said frame, inner fingers $o^3$, projecting from said arm and adapted to project under a pile of superimposed shingles, the said arm L' being adapted to engage one of the edges of the bottom shingle of said pile, a hammer pivoted on the frame, suitable connections between the hammer and the arm, whereby the upward movement of the hammer will cause a sliding movement between the arm and the frame and thereby separate the bottom shingle from the remainder, and outer lateral extensions on said arm adapted to support the remaining shingles while the bottom one is being removed and permit the return of the arm L' to its normal position on the downward stroke of the hammer, substantially as specified.

8. In a machine for laying and nailing shingles, a frame adapted to carry a pile of superimposed shingles, an arm having a sliding connection to said frame and adapted to engage the outer edge of the bottom shingle, a hammer pivoted on the said frame, stakes carried by said frame adapted to engage the inner edges of all the shingles except the bottom one, and suitable connections between the hammer and the arm, whereby the upward movement of the hammer will cause a sliding movement between the arm and frame and separate the bottom shingle from the others, substantially as set forth.

9. In a machine for laying and nailing shingles, a nail-box provided with a nail-run $f^2$ on one side and a series of ridges extending obliquely from the nail-run to the opposite side of the box, said ridges being substantially parallel to each other, for the purpose specified.

10. In a machine for laying and nailing shingles, the combination of a frame, a nail-socket supported thereon in substantially a vertical position and having a funnel-shaped mouth, a hammer-shank pivoted at one end to the frame and carrying at its other end a weighted head, said head having an interiorly-enlarged recess, and a nail-driver having an enlarged end fitting loosely in said recess, whereby the driver has a vertical movement in the nail-socket, while the head moves in the arc of a circle, substantially as specified.

11. In devices for laying and nailing shingles, a movable frame, an arm or pawl adapted to engage a fixed stop and having a sliding connection with said frame, a yoke on the frame, a hammer pivoted in said yoke, suitable connections between the hammer and the said arm or pawl, whereby the upward movement of the hammer will cause a sliding movement between the frame and said arm or pawl and cause the frame to move away from the fixed stop with which said arm or pawl engages, and a stop on the hammer adapted to engage the yoke to limit the upward movement of said hammer and the movement of the said frame, substantially as specified.

12. In a machine for laying and nailing shingles, the combination of a frame and an arm adapted to slide on said frame, a sub-frame adjustable on the frame, a hammer having its shank pivotally mounted on said sub-frame, a bell-crank having its fulcrum upon said sub-frame, a telescopic link connection between an arm of the bell-crank and the shank of the hammer, and a link connection between the other arm of the bell-crank and said sliding arm, substantially as set forth.

13. In a machine for laying and nailing shingles, a frame, a sub-frame adjustably mounted thereon, and a hammer having its shank pivotally mounted on said sub-frame, combined with a slotted handle-support $k$, a handle $k'$, mounted on said support, and a bolt $g^\times$, substantially as set forth.

14. In a machine for laying and nailing shingles, a movable frame, a sub-frame mounted thereon, and an arm having a sliding connection to the movable frame, combined with a bell-crank pivoted on the sub-frame, a link connecting one member of the bell-crank and the said arm, a hammer-shank pivoted on the sub-frame and provided with a slot, a pin adjustable in said slot, and a link connecting the adjustable pin and the other member of the bell-crank, substantially as described.

15. In a machine for laying and nailing shingles, a movable frame and a sub-frame mounted thereon, combined with nail-feeding and nail-driving devices mounted on the sub-frame, suitable mechanism, substantially as described, operated by the nail-driving device to impart a lateral movement to the movable frame, and suitable means to adjust the nail-feeding and nail-driving devices relative to the sub-frame and to the mechanism to laterally move the movable frame, as and for the purpose specified.

16. In a machine for laying and nailing shingles, the combination of a sub-frame, a bearing $p'$, pivoted upon a bar of said sub-frame, and a pressing wheel or roll $p$, mounted in said bearing, substantially as set forth.

17. The combination, with a machine for laying and nailing shingles, of a track on which said machine is adapted to run, said track being provided with parallel rows of holes, the holes of each row being differently spaced, and a device adjustable on said machine to engage the holes in either of said rows, substantially as and for the purpose specified.

18. The combination, with a machine for laying and nailing shingles, of a track, chains whose links are of a uniform length attached at one end to a fixed point, and hooks of different lengths connected to the track and adapted to be hooked to the chain, whereby the track may be variably adjusted, substantially as set forth.

19. The combination, with a machine for laying and nailing shingles, of a sectional track, transverse straps attached to each section, a board $b$, secured to the straps of two adjacent sections on one side of the track, and chains leading from the straps on the other side of the track to a fixed point of attachment, substantially as specified.

20. The combination, with a machine for laying and nailing shingles, of a track, a strap connected thereto, a hook connected with the strap, two hooks of different lengths attached to the first hook, and a chain attached to a fixed point and adapted to hook onto either of the last two hooks, substantially as specified.

21. In a machine for laying and nailing shingles, a nail-socket, a pivoted hammer, and suitable mechanism, substantially as described, to bring the nail-socket over a shingle on the upward movement of the hammer, combined with a pawl $r$, adapted to engage said shingle and hold it in position during the downward movement of the hammer to effect the nailing, as set forth.

22. The combination, with a machine for laying and nailing shingles, of a track having parallel rows of holes, the series of holes in each row being equally spaced, but the spacing being different in the several rows, a carriage $x$, adapted to slide on the track, a pawl $x^3$, pivoted on said carriage and laterally adjustable thereon to engage the holes in either row on the track, a hammer pivoted on the machine, and suitable connections between the hammer and sliding carriage, whereby the upward movement of the hammer will cause the machine to move on the track a predetermined and variable distance, substantially as specified.

23. The combination, with a machine for laying and nailing shingles, of a track on which the machine is adapted to run and a supplemental support for the track beyond the peak of the roof being shingled, whereby the machine may be operated to lay the last courses of shingles at the peak, substantially as specified.

24. The combination, with a machine for laying and nailing shingles, of a track and a supplemental support for said track beyond the peak of the roof being shingled, for the purpose specified, said supplemental support consisting of a series of brackets, each bracket consisting of two leaves hinged together and a pivoted strut to hold the two leaves apart at any desired angle, the lower leaf being adapted to rest on a fixed support and the upper leaf to support the track, substantially as set forth.

In testimony whereof I hereunto set my hand and seal.

MARK A. DEES

Witnesses:
GEORGE H. HOWARD,
EDWIN CRUSE.